(12) United States Patent  
Kato

(10) Patent No.: US 11,496,705 B2  
(45) Date of Patent: Nov. 8, 2022

(54) SIGNAL PROCESSING CIRCUIT, PHOTOELECTRIC CONVERSION APPARATUS, AND EQUIPMENT

(71) Applicant: CANON KABUSHIKI KAISHA, Tokyo (JP)

(72) Inventor: Satoshi Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/317,223

(22) Filed: May 11, 2021

(65) Prior Publication Data

US 2021/0360185 A1 Nov. 18, 2021

(30) Foreign Application Priority Data

May 18, 2020 (JP) .............................. JP2020-086730

(51) Int. Cl.
*H04N 5/378* (2011.01)
*H04N 5/369* (2011.01)

(52) U.S. Cl.
CPC ........... *H04N 5/378* (2013.01); *H04N 5/3698* (2013.01); *H04N 5/379* (2018.08)

(58) Field of Classification Search
CPC ....... H04N 5/3698; H04N 5/378; H04N 5/379
See application file for complete search history.

(56) References Cited

U.S. PATENT DOCUMENTS

| 9,071,782 | B2* | 6/2015 | Okano | H04N 5/3653 |
|---|---|---|---|---|
| 2009/0273696 | A1* | 11/2009 | Krymski | H04N 5/378 |
| | | | | 257/292 |
| 2011/0279723 | A1* | 11/2011 | Takamiya | H03M 1/0612 |
| | | | | 348/308 |
| 2015/0146063 | A1 | 5/2015 | Nishizawa | |
| 2016/0205333 | A1* | 7/2016 | Shishido | H04N 5/3658 |
| | | | | 348/308 |
| 2017/0324918 | A1 | 11/2017 | Takatsuka | |

FOREIGN PATENT DOCUMENTS

| JP | 2011-259407 A | 12/2011 |
|---|---|---|
| JP | 2016-48813 A | 4/2016 |

* cited by examiner

*Primary Examiner* — Lin Ye
*Assistant Examiner* — Chriss S Yoder, III
(74) *Attorney, Agent, or Firm* — Venable LLP

(57) ABSTRACT

A signal processing circuit includes a reference signal line, a processing circuit that processes a potential of the reference signal line and a potential of an input signal, a first reference voltage supplying circuit that outputs a predetermined potential to one end of the reference signal line, and a second reference voltage supplying circuit that outputs a predetermined potential to the other end of the reference signal line.

11 Claims, 13 Drawing Sheets

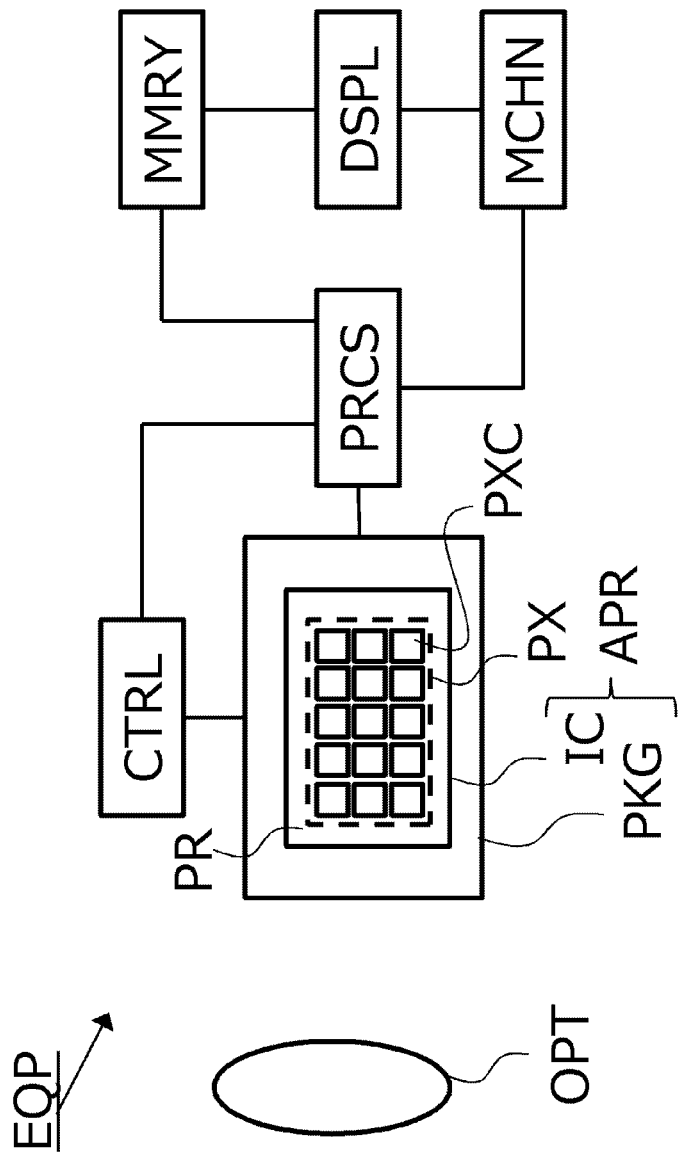

SIGNAL PROCESSING CIRCUIT, PHOTOELECTRIC CONVERSION APPARATUS, AND EQUIPMENT

BACKGROUND

Field

The present disclosure relates to a photoelectric conversion apparatus and an equipment.

Description of the Related Art

In recent years, CMOS image sensors require higher frame rates and improved signal-to-noise ratios (S/N) that are realized by an analog-digital converter (hereinafter, abbreviated as an ADC). A typical mode of an ADC is a single-slope ADC. The single-slope ADC embodies a method of performing AD conversion by comparing a signal level from a pixel and a reference signal, the voltage value of which changes over time, with each other using a comparator, and digitally counting a reversal time of a comparator output.

A configuration and a driving method of a reference signal generating circuit of a single-slope ADC are exemplified in Japanese Patent Application Laid-open No. 2011-259407.

Japanese Patent Application Laid-open No. 2011-259407 describes a method of applying an offset in order to suppress deterioration of linearity that is attributable to a settling error of a reference signal.

SUMMARY

The present disclosure includes a signal processing circuit, including a reference signal line, a processing circuit that processes a potential of the reference signal line and a potential of an input signal, a first reference voltage supplying circuit that outputs a predetermined potential to one end of the reference signal line, and a second reference voltage supplying circuit that outputs a predetermined potential to the other end of the reference signal line.

In addition, the present disclosure includes a photoelectric conversion apparatus including a photoelectric conversion circuit that outputs a signal in accordance with incident light, and the signal processing circuit as described above which processes the signal output by the photoelectric conversion circuit.

Further, the present disclosure includes an equipment including the photoelectric conversion apparatus as described above, and at least any one selected from among an optical system for forming an image on the photoelectric conversion apparatus, a control apparatus that controls the photoelectric conversion apparatus, a processing apparatus that processes a signal output from the photoelectric conversion apparatus, a display apparatus that displays information obtained by the photoelectric conversion apparatus, a storage apparatus that stores information obtained by the photoelectric conversion apparatus, and a machine apparatus that has a movable portion or a propelling portion.

Further features of the present invention will become apparent from the following description of exemplary embodiments with reference to the attached drawings.

BRIEF DESCRIPTION OF THE DRAWINGS

FIG. 13 is a diagram illustrating an equipment according to a third embodiment.

DESCRIPTION OF THE EMBODIMENTS

Simply applying the method described in Japanese Patent Application Laid-open No. 2011-259407 is becoming insufficient to realize acceleration of responsiveness of a reference signal and the following problems exist.

For example, the responsiveness of a reference signal is not only affected by the time it takes for a settling error described in Japanese Patent Application Laid-open No. 2011-259407 to reach a predetermined level or lower but also affected by a settling time of the abovementioned offset itself. A reset time of reference voltage also affects the responsiveness of a reference signal. Since these times are largely dependent upon a parasitic element component of a transmission line of the reference signal, means for improving responsiveness of the reference signal while effectively reducing an effect of the parasitic element component is required.

In consideration thereof, the present disclosure provides a technique for realizing securement of responsiveness at a higher speed of a reference signal in a signal processing circuit.

Hereinafter, embodiments of the present disclosure will be described with reference to the drawings. It should be noted that same or similar components, members, and processing steps that are illustrated in the respective drawings will be denoted by same reference signs and redundant descriptions will be omitted as deemed appropriate. It should also be noted that the components, the members, and the processing steps will be displayed in the respective drawings with parts thereof being omitted.

First Embodiment

Next, a first embodiment according to the present disclosure will be described with reference to the drawings.

Figure 1:
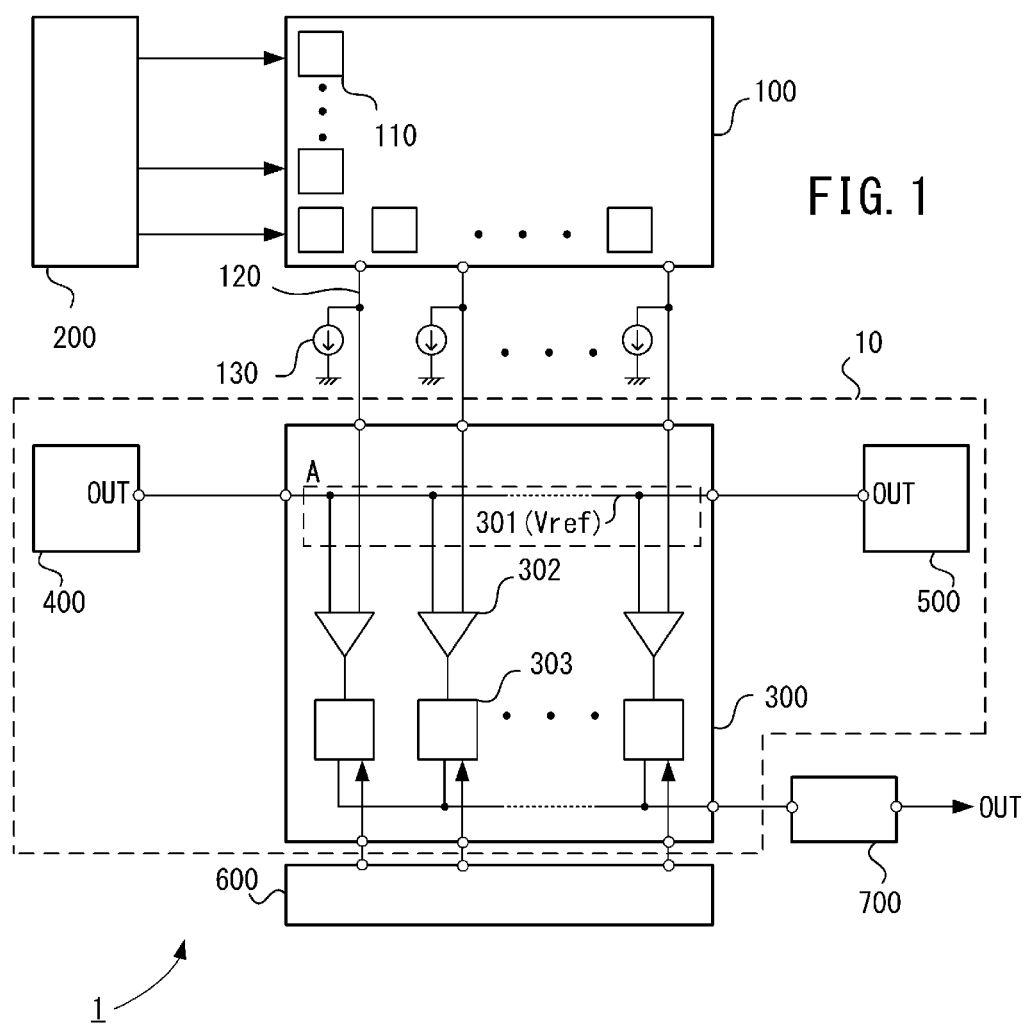
FIG. 1 is a block diagram of a photoelectric conversion apparatus according to a first embodiment.

FIG. 1 is a circuit block diagram of a photoelectric conversion apparatus according to the first embodiment and is also an arrangement diagram of circuit blocks in a plan view. In this case, a "plan view" refers to a view from a perpendicular direction with respect to a main surface of a semiconductor substrate. The main surface of a semiconductor substrate may be a light-incidence surface of a semiconductor substrate including a photoelectric conversion circuit, a surface on which a plurality of ADCs are repetitively arranged, or a joint surface between substrates in a stacked photoelectric conversion apparatus.

As shown in FIG. 1, a circuit of a photoelectric conversion apparatus 1 according to the present embodiment has a pixel array 100, a vertical scanning circuit 200, a signal processing circuit 10, a horizontal scanning circuit 600, and an output circuit 700. The pixel array 100 is a photoelectric conversion circuit in which a pixel 110 including a photodiode (PD) that outputs a predetermined voltage value in accordance with incident light to the photoelectric conversion apparatus as a component is arranged in a two-dimensional array pattern. The vertical signal line 120 is connected to each pixel column of the pixel array 100. The vertical signal line 120 is a signal line for transmitting an output signal from the pixel 110 of the pixel array 100 to a circuit in a subsequent stage. A current source 130 to function as a load for operating an amplifier circuit of the pixel 110 of which a representative example is a source follower circuit is connected to each vertical signal line 120. The signal processing circuit 10 has a column ADC array 300, a first reference voltage supplying circuit 400, and a second reference voltage supplying circuit 500.

The vertical scanning circuit 200 is connected to the pixel array 100 and selects and controls a read row or a reset row of the pixel array 100.

The column ADC array 300 receives a potential of the vertical signal line 120 that is an output signal from the pixel array 100 as an input and converts the potential into a digital value. The column ADC array 300 has a reference signal line 301, a comparator 302, and a counter memory 303. The reference signal line 301 is connected to the first reference voltage supplying circuit 400 and to the second reference voltage supplying circuit 500 and transmits a reference signal in a prescribed period. The comparator 302 is a processing circuit that executes processing for comparing a potential of an analog signal that is input from the vertical signal line 120 as an input signal line and a potential of the reference signal line 301 with each other. As shown in FIG. 1, the comparator 302 is provided in plurality in the column ADC array 300 and the reference signal line 301 is connected to the plurality of comparators 302. In addition, a corresponding vertical signal line 120 is connected to each of the plurality of comparators 302. The counter memory 303 digitally counts a reversal time point of an output from the comparator 302 and retains a count result.

The first reference voltage supplying circuit 400 and the second reference voltage supplying circuit 500 output a predetermined potential to the reference signal line 301. The predetermined potential is a reference signal that is, for example, a ramp signal.

Figure 2:
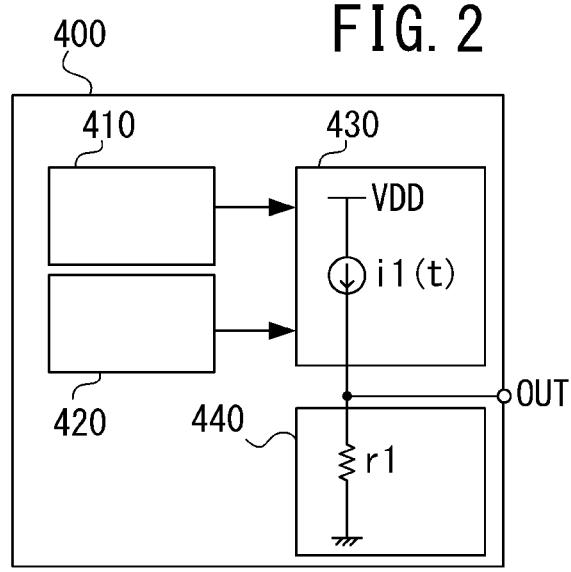
FIG. 2 is a circuit diagram showing a configuration example of a first reference voltage supplying circuit according to the first embodiment.
Figure 3:
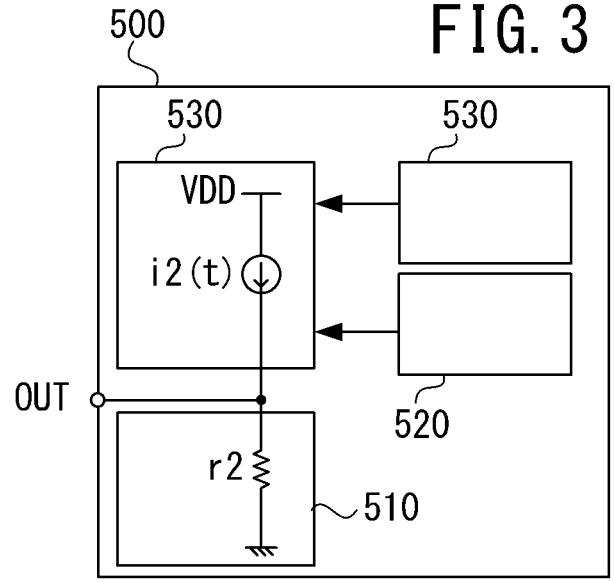
FIG. 3 is a circuit diagram showing a configuration example of a second reference voltage supplying circuit according to the first embodiment.

FIGS. 2 and 3 are, respectively, circuit block diagrams of the first reference voltage supplying circuit 400 and the second reference voltage supplying circuit 500. As shown in FIG. 2, the first reference voltage supplying circuit 400 has a current control counter 410, an offset control circuit 420, a current source 430, and a load resistor 440. A current i1 of the current source 430 is transiently controlled by the current control counter 410 and the offset control circuit 420 and a potential in accordance with a product of the current i1 and a resistance r1 of the load resistor 440 appears in an output out of the first reference voltage supplying circuit 400.

In addition, as shown in FIG. 3, the second reference voltage supplying circuit 500 shares a similar configuration to the first reference voltage supplying circuit 400 and has a current control counter 510, an offset control circuit 520, a current source 530, and a load resistor 540. A current i2 of the current source 530 is transiently controlled by the current control counter 510 and the offset control circuit 520 and a potential in accordance with a product of the current i2 and a resistance r2 of the load resistor 540 appears in an output out of the second reference voltage supplying circuit 500. It should be noted that the current control counter 510 and the offset control circuit 520 correspond to power control circuit that controls power of the second reference voltage supplying circuit 500.

In the present embodiment, it is assumed that resistance values of the resistances r1 and r2 are equal to each other and that the current control counters 410 and 510 and the offset control circuits 420 and 520 operate so as to equalize current amounts of the currents i1 and i2. Accordingly, the first reference voltage supplying circuit 400 and the second reference voltage supplying circuit 500 supply a same potential to the reference signal line 301. In this case, a same potential means a same potential by design and a potential difference due to manufacturing error may be present.

The horizontal scanning circuit 600 is connected to the column ADC array 300 and generates a control signal for sequentially reading out digital signals retained in the counter memory 303 to the outside of the chip via the output circuit 700.

Next, operations related to AD conversion of a photoelectric conversion apparatus having the circuit shown in FIG. 1 will be described with reference to the timing chart shown in FIG. 4.

Figure 4:
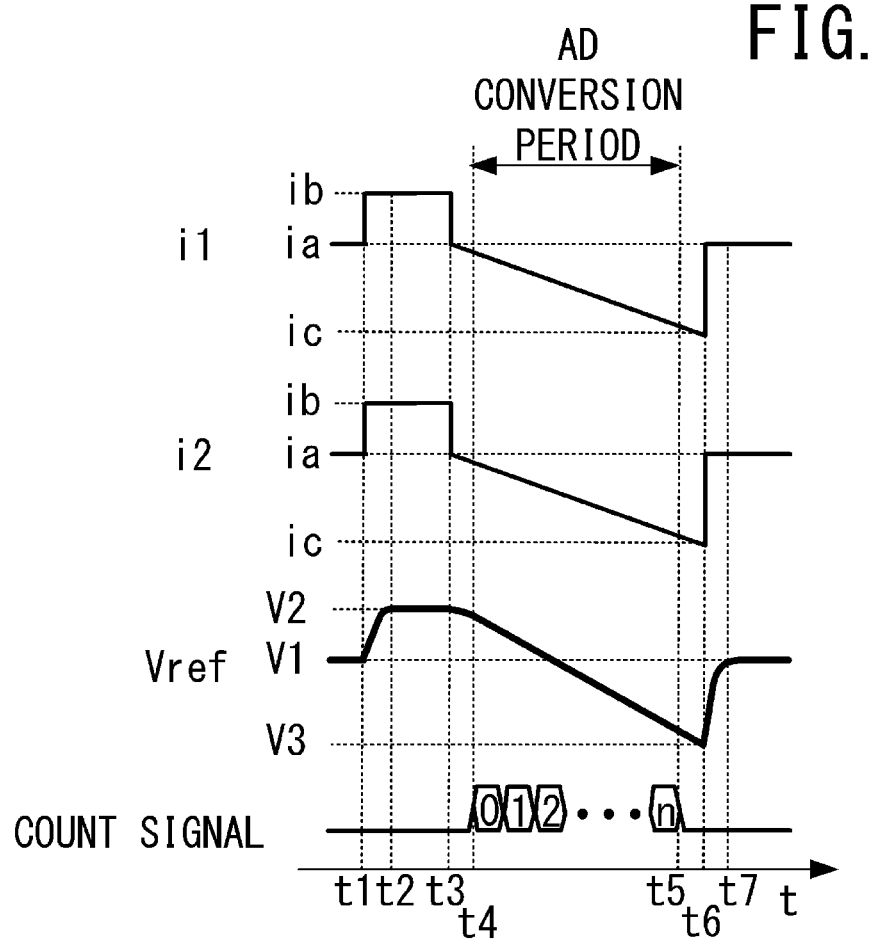
FIG. 4 is a timing chart of operations of the photoelectric conversion apparatus according to the first embodiment.

As shown in FIG. 4, as a preparatory operation for early linearity stabilization of a ramp signal, during a period from a time point t1 to a time point t3, current amounts of the currents i1 and i2 respectively increase from ia to ib based on control signals from the offset control circuits 420 and 520. Accordingly, the potential (Vref) of the reference signal line 301 rises from V1 to V2. A settling time (t2−t1) from the potential V1 to the potential V2 at this point will be referred to as an "offset time".

In addition, the current control counters 410 and 510 operate so that the current amounts of the currents i1 and i2 change from ib to ia at the time point t3 and the currents i1 and i2 subsequently decline at a constant gradient relative to time and, accordingly, a ramp operation of the potential Vref is started.

At this point, during a period from the time point t3 to a time point t4, an AD conversion operation is not performed in order to suppress a deterioration in linearity attributable to a settling error of the potential Vref. Subsequently, a count operation by the counter memory 303 and AD conversion are started at a time point (the time point t4) at which the settling error falls to or below an allowable value determined in advance. In this case, a time (t4−t3) from the time point t3 to the time point t4 is referred to as a "run-up time".

During a period from the time point t4 to a time point t5, as an AD conversion period, the column ADC array 300 performs counting as many times as a count number n in accordance with a resolution of the ADCs and stores a count value upon reversal of the comparator 302 during the AD conversion period as a digital value in the counter memory 303.

In addition, at a time point (a time point t6) at which counting by the column ADC array 300 is completed and the potential Vref drops to V3, the current control counters 410 and 510 are reset. In addition, the current amounts of the currents i1 and i2 are raised from is to ia, and the potential Vref is reset to V1 to create a stand-by state until a next AD conversion operation. A settling time (t7–t6) from the potential V3 to the potential V1 at this point will be referred to as a "reset time". This concludes the description of a series of operations related to AD conversion in the photoelectric conversion apparatus 1.

In the description given above, the offset time, the run-up time, and the reset time are determined by the currents i1 and i2, the load resistances r1 and r2, and a parasitic resistance rp and a parasitic capacitance cp of the reference signal line 301 in a section denoted by "A" in FIG. 1. It should be noted that a total resistance value as viewed from both ends of the column ADC array 300 is assumed as the parasitic resistance rp. In addition, the parasitic capacitance cp is assumed to include not only a parasitic capacitance of wiring but also an input capacitance of the comparator 302 and the like. Furthermore, as described earlier, with respect to the first reference voltage supplying circuit 400 and the second reference voltage supplying circuit 500, the current amounts of the currents i1 and i2 are equal to each other and resistance values of the resistances r1 and r2 are equal to each other. Accordingly, the first reference voltage supplying circuit 400 and the second reference voltage supplying circuit 500 can be regarded as equivalent circuits.

Figure 5:
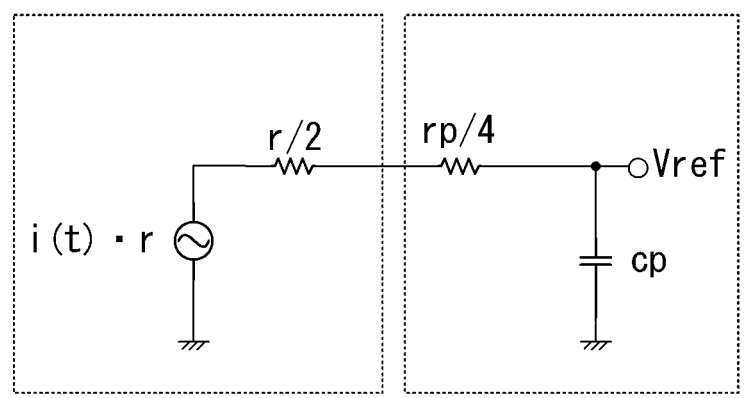
FIG. 5 is a small-signal equivalent circuit diagram of a circuit of the photoelectric conversion apparatus according to the first embodiment.

In consideration of the above, the reference signal line 301, the first reference voltage supplying circuit 400, and the second reference voltage supplying circuit 500 can be replaced with a small-signal equivalent circuit as a model that indicates a potential of the reference signal line 301 at a central portion of the column ADC array 300 where a parasitic impedance increases. FIG. 5 shows an example of the small-signal equivalent circuit. In FIG. 5, it is assumed that $i(t)=i1(t)=i2(t)$ and $r=r1=r2$.

By adopting a configuration in which the first reference voltage supplying circuit 400 is arranged at one end and the second reference voltage supplying circuit 500 is arranged at the other end of the column ADC array 300 as shown in FIG. 1 and the reference signal line 301 is driven from both ends, an effective parasitic resistance of rp/4 is obtained as shown in FIG. 5. In other words, in a plan view of the signal processing circuit 10, the processing circuit is arranged so as to be sandwiched between the first reference voltage supplying circuit 400 and the second reference voltage supplying circuit 500. The processing circuit, the first reference voltage supplying circuit 400, and the second reference voltage supplying circuit 500 need not necessarily be arranged on a single straight line. In other words, the processing circuit may be displaced in a direction that is perpendicular to a straight line connecting the first reference voltage supplying circuit 400 and the second reference voltage supplying circuit 500 to each other. Preferably, at least a part of the column ADC array 300 including the processing circuit is positioned on the straight line. Accordingly, when the signal processing circuit 10 is viewed in one direction (for example, a left-right direction in the drawing), a positional relationship is created in which geometric centers of a plurality of comparators 302 are present at positions sandwiched between a geometric center of the first reference voltage supplying circuit 400 and a geometric center of the second reference voltage supplying circuit 500. It should be noted that the geometric center of the first reference voltage supplying circuit 400, the geometric centers of the comparators 302, and the geometric center of the second reference voltage supplying circuit 500 need not necessarily be arranged on a single straight line in one direction of the signal processing circuit 10.

For example, the first reference voltage supplying circuit 400 and the second reference voltage supplying circuit 500 are arranged by being moved to a side of one end of the column ADC array 300. In this case, the side on which the first reference voltage supplying circuit 400 and the second reference voltage supplying circuit 500 are arranged is more affected by a parasitic impedance. In addition, in the column ADC array 300, the parasitic resistance at an end on the opposite side to the side on which the first reference voltage supplying circuit 400 and the second reference voltage supplying circuit 500 are arranged is rp. Accordingly, it is shown that the parasitic resistance is reduced by (3×rp)/4 by configuring the column ADC array 300 as described above.

In the photoelectric conversion apparatus according to the present embodiment, as described above, the comparator 302 is arranged so as to be sandwiched between the first reference voltage supplying circuit 400 and the second reference voltage supplying circuit 500 in a plan view of the signal processing circuit. Due to an effect of reducing an effective parasitic resistance that is obtained by such an arrangement, in the signal processing circuit, responsiveness of a reference signal improves and the offset time, the run-up time, and the reset time described above can be respectively reduced. The reduction of these time is synonymous with a reduction of the time from the time point t1 to a time point t7 that is necessary for one AD conversion operation shown in FIG. 4. Therefore, with the photoelectric conversion apparatus according to the present embodiment using such a signal processing circuit, a reduction in a read time per one pixel row and a higher frame rate of a CMOS image sensor can be realized.

The advantageous effect described above is not limited to a configuration that uses two or more reference voltage supplying circuits and can also be obtained by a configuration that uses a single reference voltage supplying circuit. Even when the reference signal line 301 is driven from a side of one end of the column ADC array 300 using a single reference voltage supplying circuit that is equivalent to a voltage generating circuit illustrated in FIG. 5, an effect of realizing a higher frame rate due to a reduced parasitic resistance similar to that described above can be obtained. In addition, with the photoelectric conversion apparatus according to the present embodiment, since a localized increase in current density inside the apparatus can also be suppressed, crosstalk and patterned noise that are attributable to a localized increase in current density can also be reduced.

In addition, the circuit configurations of the first reference voltage supplying circuit 400 and the second reference voltage supplying circuit 500 in the present embodiment are not limited to the circuit configurations shown in FIGS. 2 and 3. For example, the first reference voltage supplying circuit 400 and the second reference voltage supplying circuit 500 may be replaced with a reference voltage supplying circuit having a circuit shown in FIG. 6. The reference voltage supplying circuit shown in FIG. 6 has a current source 431, an integral capacitor 450, and a reset circuit 460. In the reference voltage supplying circuit shown in FIG. 6, the current source 431, the integral capacitor 450, and the reset circuit 460 are connected to an output out that is connected to the reference signal line 301 shown in FIG. 1. The reset circuit 460 controls a connection to the current source 431 of a potential V1. It should be noted that instead of internally generating voltage of the potential V1 by the current source 431, a configuration may be adopted in which voltage is supplied to the reset circuit 460 from an external voltage source.

Figure 6:
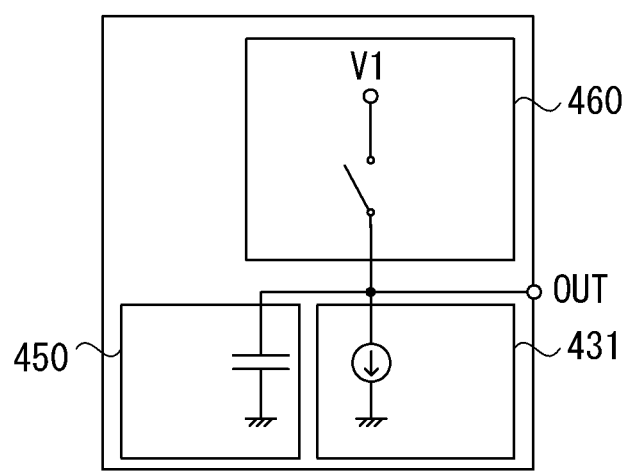
FIG. 6 is a circuit diagram showing another configuration example of a reference voltage supplying circuit according to the first embodiment.

In the reference voltage supplying circuit shown in FIG. 6, after the reference signal line 301 is reset to the potential V1 by the reset circuit 460, a reference signal is generated by lowering the potential over time by extracting charges that are retained in the integral capacitor 450 with the current source 431. In this case, in a similar manner to a case of using the circuits shown in FIGS. 2 and 3, a reduction in the parasitic resistance described earlier enables a run-up time and a reset time to be shortened.

In addition, in the photoelectric conversion apparatus according to the present embodiment, the arrangement of the first reference voltage supplying circuit 400 and the second reference voltage supplying circuit 500 shown in FIG. 1 is not necessarily limited to positions of both ends of the column ADC array 300. For example, a configuration of a photoelectric conversion apparatus 1' that is a CMOS image sensor with a stack structure shown in FIG. 7 may be adopted. In a similar manner to FIG. 1, FIG. 7 doubles as an arrangement diagram of a circuit block that presents a plan view of each substrate.

Figure 7:
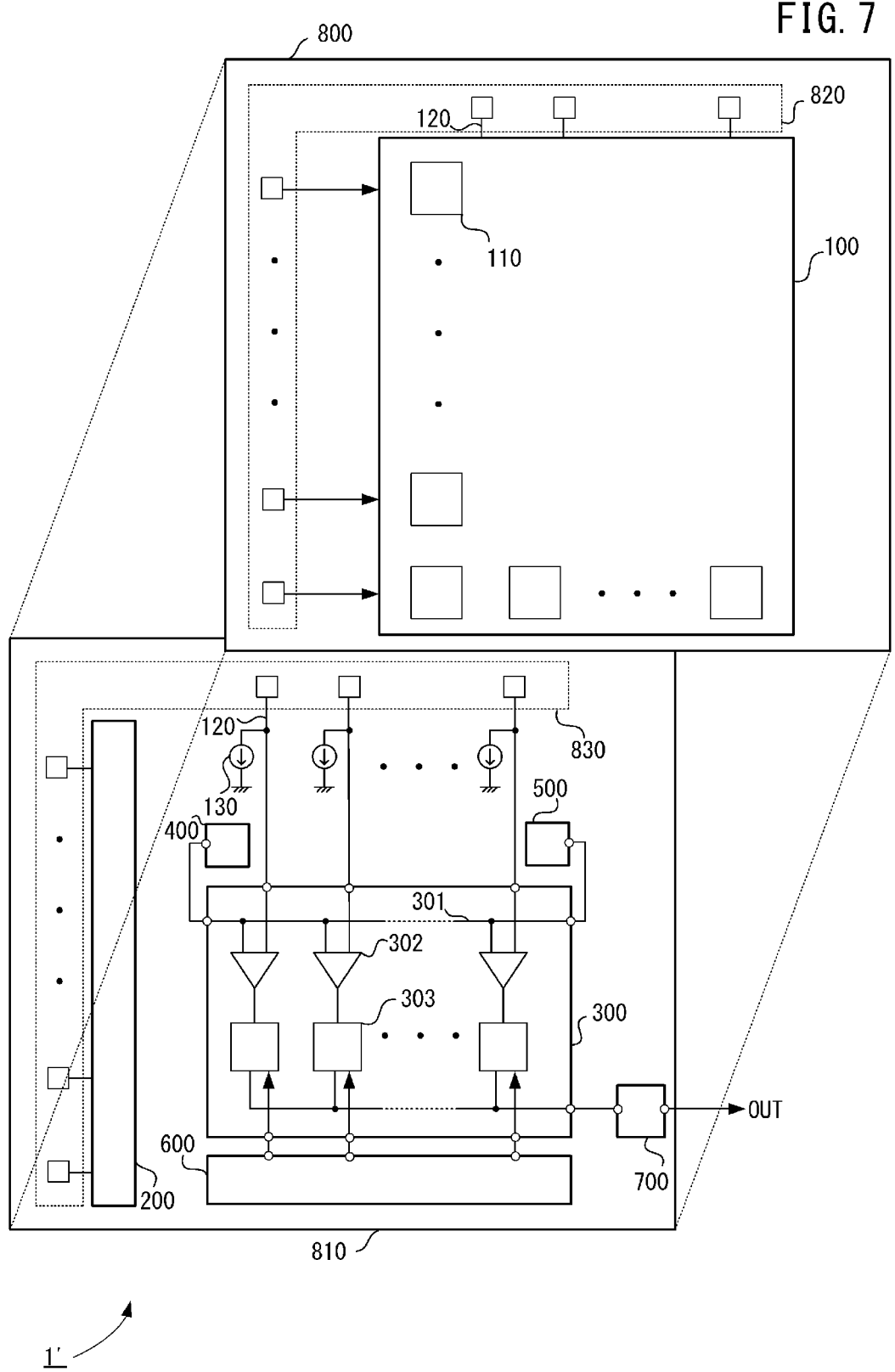
FIG. 7 is a block diagram showing another configuration of the photoelectric conversion apparatus according to the first embodiment.

In FIG. 7, the photoelectric conversion apparatus 1' has a pixel substrate 800 and a circuit substrate 810. The pixel substrate 800 has the pixel array 100 shown in FIG. 1 in which pixels 110 are arranged in an array pattern and a connecting portion 820. The pixel array 100 and the connecting portion 820 are connected by the vertical signal line 120. In addition, the circuit substrate 810 has the vertical scanning circuit 200, the column ADC array 300, the first and second reference voltage supplying circuits 400 and 500, the horizontal scanning circuit 600, and the output circuit 700 shown in FIG. 1. Furthermore, the circuit substrate 810 has a connecting portion 830 that is similar to the connecting portion 820 of the pixel substrate 800. The vertical signal line 120 and the current source 130 are connected to the column ADC array 300 and the connecting portion 830. The column ADC array 300 has the reference signal line 301, the comparator 302, and the counter memory 303 in a similar manner to that shown in FIG. 1. Description of details of components denoted by reference signs shared by FIG. 1 is omitted.

The pixel substrate 800 and the circuit substrate 810 perform transmission/reception of signals via the connecting portion 820. As shown in FIG. 7, there may be cases where the first and second reference voltage supplying circuits 400 and 500 cannot be arranged at both ends of the column ADC array 300 due to constraints to chip sizes of the pixel substrate 800 and the circuit substrate 810 and associated constraints to circuit arrangements of the connecting portion 820 and the vertical scanning circuit 200. Even in such a case, as illustrated in FIG. 7, the first reference voltage supplying circuit 400 and the second reference voltage supplying circuit 500 can be arranged at positions on a side of an upper end of the column ADC array 300. In addition, a similar advantageous effect to the case shown in FIG. 1 is obtained when a parasitic impedance associated with routing of the reference signal line 301 from the first and second reference voltage supplying circuits 400 and 500 to the column ADC array 300 is smaller than the parasitic impedance inside the column ADC array 300.

As described above, in the signal processing circuit according to the present embodiment and the photoelectric conversion apparatus using the signal processing circuit, arrangements of the first reference voltage supplying circuit 400 and the second reference voltage supplying circuit 500 can be given a degree of freedom while obtaining an effect of reducing parasitic resistance.

Second Embodiment

Next, a second embodiment according to the present disclosure will be described with reference to FIG. 8. It should be noted that, in the following description, components similar to those of the first embodiment will be denoted by the same reference signs and detailed descriptions thereof will be omitted.

Figure 8:
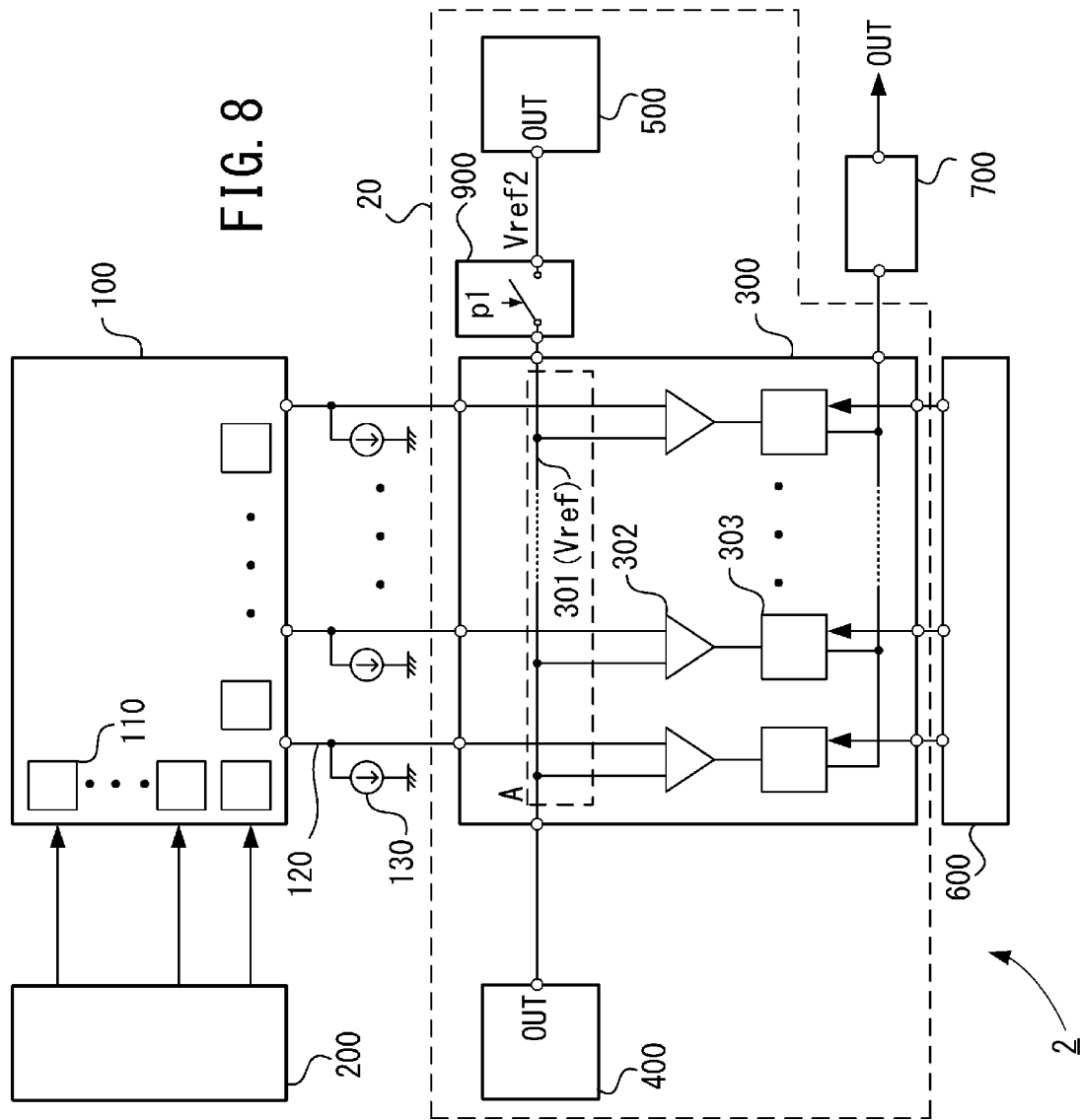
FIG. 8 is a block diagram of a photoelectric conversion apparatus according to a second embodiment.

As shown in FIG. 8, a signal processing circuit 20 of a photoelectric conversion apparatus 2 according to the present embodiment has a switch 900. The switch 900 is a connecting circuit for controlling a connection between an output of the second reference voltage supplying circuit 500 and the reference signal line 301 with a pulse p1. In this case, it is assumed that the output of the second reference voltage supplying circuit 500 and the reference signal line 301 become conductive when the pulse p1 is high and that the output of the second reference voltage supplying circuit 500 and the reference signal line 301 become non-conductive when the pulse p1 is low. Components other than the signal processing circuit 20 are similar to the respective components of the photoelectric conversion apparatus 1 according to the first embodiment.

Next, operations related to AD conversion of the circuit configured as shown in FIG. 8 will be described with reference to the timing chart shown in FIG. 9.

Figure 9:
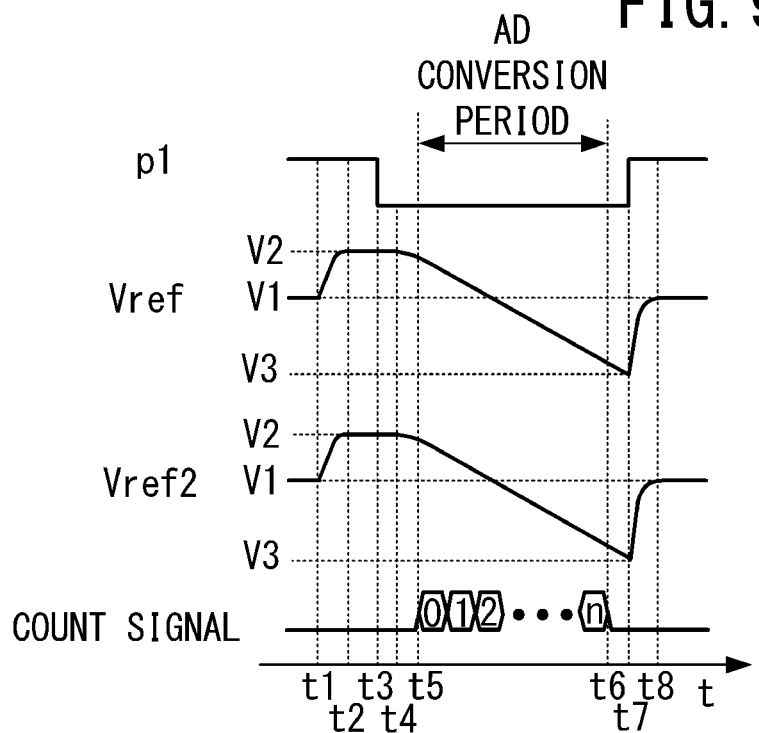
FIG. 9 is a timing chart of operations of the photoelectric conversion apparatus according to the second embodiment.

In FIG. 9, during a period from a time point t1 to a time point t3 including the offset time described above, the pulse p1 becomes high and the reference signal line 301 is driven from both ends by the first reference voltage supplying circuit 400 and the second reference voltage supplying circuit 500.

Next, when the pulse p1 changes from high to low at the time point t3, the switch 900 causes the connection between the output of the second reference voltage supplying circuit 500 and the reference signal line 301 to enter a non-connected state. In addition, during a period from the time point t3 to a time point t7 including an AD conversion period, the reference signal line 301 is driven only by the first reference voltage supplying circuit 400.

Subsequently, the pulse p1 changes from low to high at the time point t7 and, during a reset operation time including the reset time described earlier, the reference signal line 301 is once again driven from both ends of the reference signal line 301 by the first reference voltage supplying circuit 400 and the second reference voltage supplying circuit 500.

As described above, by having only one reference voltage supplying circuit drive the reference signal line 301 during the AD conversion period, a variation in reference signal characteristics for each pixel column attributable to a difference in characteristics between the first reference voltage supplying circuit 400 and the second reference voltage supplying circuit 500 can be reduced. This point will be described in greater detail below.

When the photoelectric conversion apparatus 2 is used as a multi-pixel CMOS image sensor, since the first reference voltage supplying circuit 400 and the second reference voltage supplying circuit 500 are arranged separated from each other, the photoelectric conversion apparatus 2 is more susceptible to relative variations in characteristics of elements such as transistors and resistors. In such a case, there is a concern that a slight difference may be created between characteristics of reference signals respectively generated by the first reference voltage supplying circuit 400 and the second reference voltage supplying circuit 500. In addition, the two signals in which such a difference in characteristics has been created is superimposed on a single signal node and is used as a reference for arithmetic processing such as AD conversion. Furthermore, in accordance with a positional relationship between the first reference voltage supplying circuit 400 and the second reference voltage supplying circuit 500, a difference is also created in characteristics of a reference signal to be input to the comparator 302 of each pixel column. As a result, a variation in a conversion coefficient is created for each pixel column and, depending on specifications required of the photoelectric conversion apparatus 2, a non-negligible fixed-pattern noise is created and image quality deteriorates.

In consideration thereof, in the present embodiment, as shown in FIGS. 8 and 9, the reference signal line 301 is driven only by the first reference voltage supplying circuit 400 during the AD conversion period so that AD conversion performance is determined by just one reference signal. In addition, during a period other than the AD conversion period, the switch 900 makes nodes of the second reference voltage supplying circuit 500 and the reference signal line 301 conductive and causes the reference signal line 301 to be also driven from the second reference voltage supplying circuit 500. Accordingly, the offset time and the reset time can be reduced and both improved image quality and a higher frame rate can be achieved in the photoelectric conversion apparatus 2.

Figure 10:
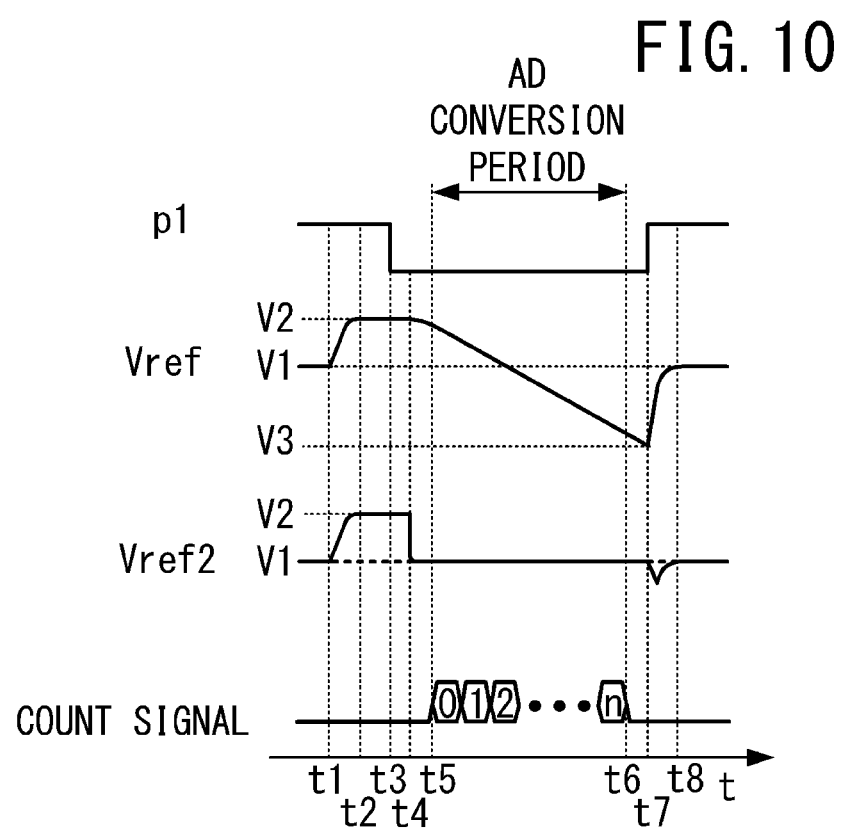
FIG. 10 is another timing chart of operations of the photoelectric conversion apparatus according to the second embodiment.

It should be noted that a voltage waveform of the second reference voltage supplying circuit 500 in the second embodiment is not limited to that shown in FIG. 9 and, for example, the second reference voltage supplying circuit 500 may have a voltage waveform such as that shown in FIG. 10 and the second reference voltage supplying circuit 500 may be constituted by a circuit that realizes such a voltage waveform. In FIG. 10, an output potential Vref2 from the second reference voltage supplying circuit 500 is a same potential as the first reference voltage supplying circuit 400 and drives the reference signal line 301 during a period from a time point t1 to a time point t3 in which the pulse p1 is high. In addition, the output potential Vref2 is reset to a predetermined potential (a potential V1 in FIG. 10) during a part of a period in which the pulse p1 is low. By controlling the output potential Vref2 in this manner, since the second reference voltage supplying circuit 500 need only be able to perform voltage output of the potential V1 and the potential V2, a configuration of the second reference voltage supplying circuit 500 can be simplified. Accordingly, the photoelectric conversion apparatus 2 can be more advantageously configured from the perspectives of circuit area and power consumption.

Figure 11:
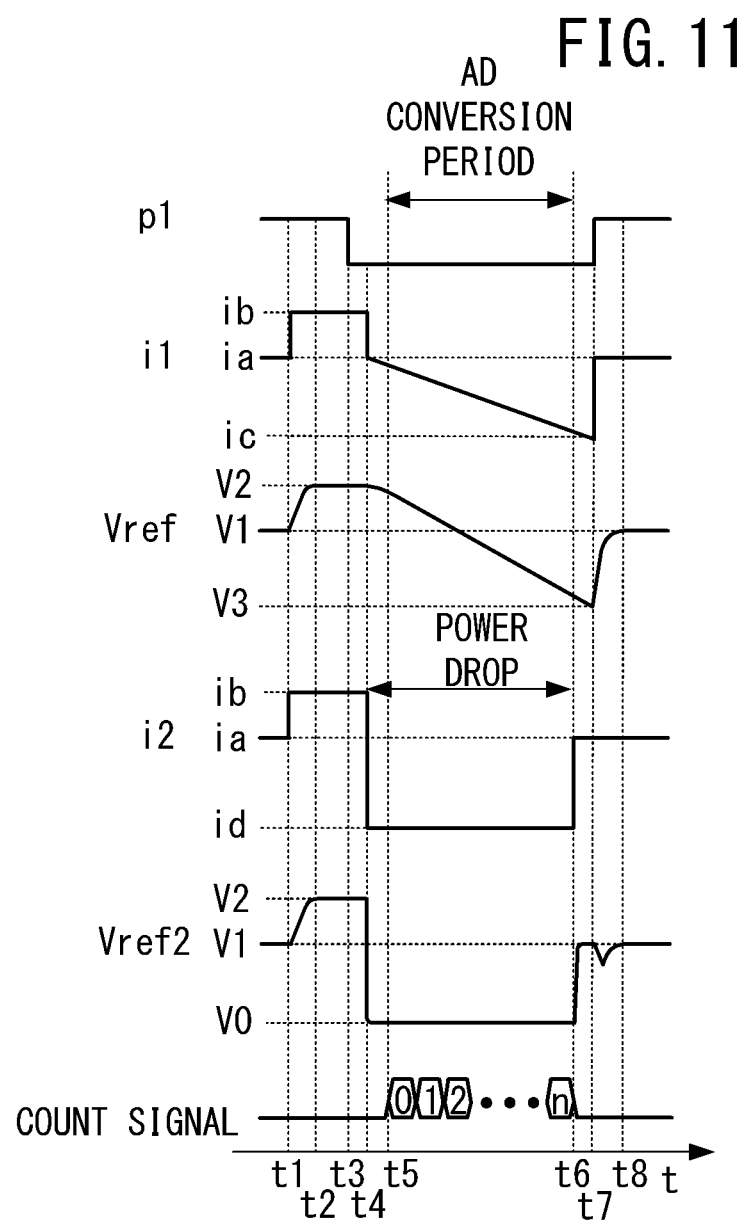
FIG. 11 is yet another timing chart of operations of the photoelectric conversion apparatus according to the second embodiment.

In a similar manner, the second reference voltage supplying circuit 500 can be driven according to the voltage waveform shown in FIG. 11. FIG. 11 assumes a case where the first reference voltage supplying circuit 400 and the second reference voltage supplying circuit 500 are realized by the circuit configurations shown in FIGS. 2 and 3.

In FIG. 11, the first reference voltage supplying circuit 400 performs operations similar to those in the first embodiment. In the second reference voltage supplying circuit 500, during a period in which the pulse p1 is high, a current i2 is set so as to have a same current amount as a current i1 of the first reference voltage supplying circuit 400. However, in the second reference voltage supplying circuit 500, when the pulse p1 becomes low and a connection with the reference signal line 301 changes from a connected state to a non-connected state, the current amount drops to id as shown in a period from a time point t4 to a time point t6 in FIG. 11. In this manner, during a period in which the second reference voltage supplying circuit 500 is disconnected from the reference signal line 301 and drive of the second reference voltage supplying circuit 500 is not required, power to be supplied to the second reference voltage supplying circuit 500 can be reduced.

Figure 12:
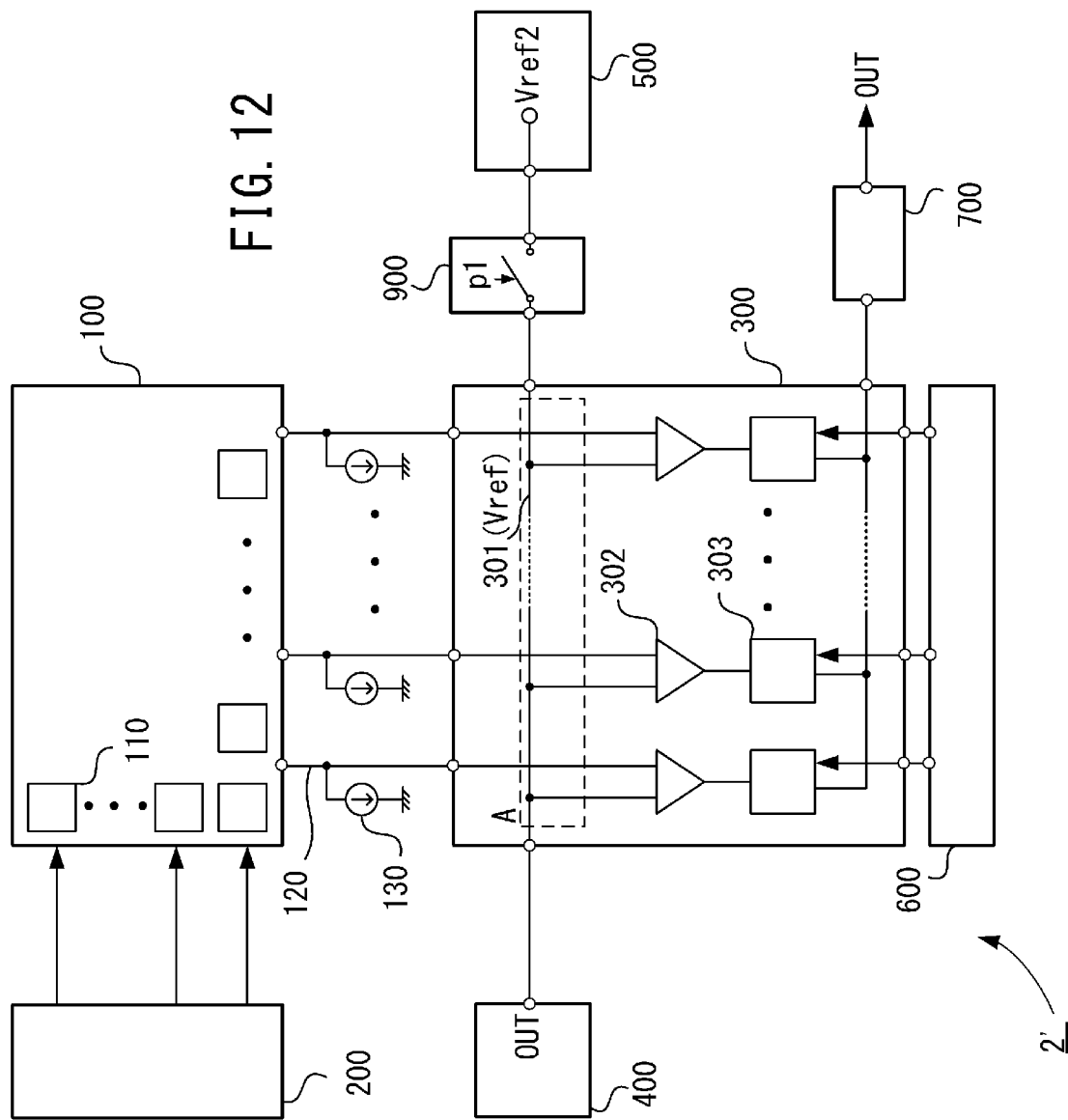
FIG. 12 is a block diagram showing another configuration of the photoelectric conversion apparatus according to the second embodiment.

In addition, the first reference voltage supplying circuit 400 and the second reference voltage supplying circuit 500 need not necessarily adopt a same circuit configuration. For example, as shown in FIG. 12, the first reference voltage supplying circuit 400 may be realized by the circuit shown in FIG. 2 and the second reference voltage supplying circuit 500 may be realized by a circuit that operates so as to supply the potential Vref2 shown in FIG. 10. An advantageous effect similar to that described above can also be produced with such a circuit configuration.

Third Embodiment

FIG. 13 is a schematic view illustrating a semiconductor apparatus APR according to the present embodiment. The semiconductor apparatus APR includes a semiconductor device IC and may include, in addition to the semiconductor device IC, a package PKG for mounting the semiconductor device IC. In the present embodiment, the semiconductor apparatus APR is a photoelectric conversion apparatus (an imaging apparatus) according to the first embodiment or the second embodiment. The semiconductor device IC has a pixel region PX in which pixel circuits PXC are arranged in a matrix and a peripheral region PR in a periphery of the pixel region PX. The peripheral region PR can be provided with a peripheral circuit.

In addition, the semiconductor apparatus APR is included in an equipment EQP. The equipment EQP may include at least any of an optical system OPT, a control apparatus CTRL, a processing apparatus PRCS, a display apparatus DSPL, a storage apparatus MMRY, and a machine apparatus MCHN.

The semiconductor apparatus APR can include, in addition to the semiconductor device IC, a package PKG for housing the semiconductor device IC. The package PKG can include a substrate to which the semiconductor device IC is fixed, a lid body made of glass or the like that opposes the semiconductor device IC, and a joining member such as a bonding wire or a bump that connects a terminal provided on the substrate and a terminal provided on the semiconductor device IC to each other.

The equipment EQP can include at least any of the optical system OPT, the control apparatus CTRL, the processing apparatus PRCS, the display apparatus DSPL, the storage apparatus MMRY, and the machine apparatus MCHN. The optical system OPT forms an image on the semiconductor apparatus APR. The optical system OPT is, for example, a lens, a shutter, and a mirror. The control apparatus CTRL controls the semiconductor apparatus APR. The control device CTRL is, for example, a photoelectric conversion apparatus such as an ASIC.

The processing apparatus PRCS processes signals output from the semiconductor apparatus APR. The processing apparatus PRCS is a photoelectric conversion apparatus such as a CPU or an ASIC for constructing an AFE (analog front end) or a DFE (digital front end). The display apparatus DSPL is an EL display apparatus or a liquid crystal display apparatus that displays information (an image) obtained by the semiconductor apparatus APR. The storage apparatus MMRY is a magnetic device or a semiconductor device that stores information (an image) obtained by the semiconductor apparatus APR. The storage apparatus MMRY is a volatile memory such as an SRAM or a DRAM or a nonvolatile memory such as a flash memory or a hard disk drive.

The machine apparatus MCHN has a movable portion or a propelling portion such as a motor or an engine. The equipment EQP displays a signal output from the semiconductor apparatus APR on the display apparatus DSPL or transmits the signal to the outside using a communication apparatus (not illustrated) included in the equipment EQP. Therefore, the equipment EQP preferably further includes a storage apparatus MMRY and a processing apparatus PRCS separately from a storage circuit and an arithmetic circuit that are included in the semiconductor apparatus APR. The machine apparatus MCHN may be controlled based on a signal output from the semiconductor apparatus APR.

In addition, the equipment EQP is suitable for an electronic equipment such as an information terminal (for example, a smartphone or a wearable terminal) having a photographic function or a camera (for example, an interchangeable lens camera, a compact camera, a video camera, or a monitoring camera). The machine apparatus MCHN in a camera can drive parts of the optical system OPT for the purposes of zooming, focusing, and shutter operations.

In addition, the equipment EQP may be a transportation equipment such as a vehicle, an ocean vessel, or an aircraft. The machine apparatus MCHN in the transportation equipment may be used as a moving apparatus. The equipment EQP as a transportation equipment is suitable as an equipment that transports the semiconductor apparatus APR or an equipment that assists and/or automates driving (operation) using the photographic function. The processing apparatus PRCS for assisting and/or automating driving (operation) can perform processing for operating the machine apparatus MCHN as a moving apparatus based on information obtained by the semiconductor apparatus APR. Alternatively, the equipment EQP may be a medical equipment such as an endoscope, a measuring equipment such as a ranging sensor, an analyzing equipment such as an electron microscope, or an office equipment such as a copier.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the photoelectric conversion apparatus described above may have a structure (a chip stack structure) in which a first semiconductor chip provided with pixels and a second semiconductor chip provided with readout circuits (peripheral circuits) are stacked. Each of the readout circuits (peripheral circuits) in the second semiconductor chip can be configured as a column circuit that corresponds to a pixel column in the first semiconductor chip. Alternatively, each of the readout circuits (peripheral circuits) in the second semiconductor chip can be configured as a matrix circuit that corresponds to a pixel or a pixel block in the first semiconductor chip. As a connection between the first semiconductor chip and the second semiconductor chip, a through-electrode (TSV), inter-chip wiring by a direct bond using a metal such as copper (Cu), an inter-chip microbump, or the like can be adopted.

According to the present disclosure, securement of responsiveness at a higher speed of a reference signal in a signal processing circuit can be realized.

This application claims the benefit of Japanese Patent Application No. 2020-086730, filed on May 18, 2020, which is hereby incorporated by reference herein in its entirety.

What is claimed is:

1. A signal processing circuit, comprising:
    a reference signal line;
    a processing circuit that processes a potential of the reference signal line and a potential of an input signal;
    a first reference voltage supplying circuit that outputs a predetermined potential to one end of the reference signal line;
    a second reference voltage supplying circuit that outputs a predetermined potential to the other end of the reference signal line; and
    a connecting circuit for connecting, during at least a part of a period in which the first reference voltage supplying circuit is outputting the predetermined potential to the one end of the reference signal line, the second reference voltage supplying circuit and the other end of the reference signal line to each other.

2. The signal processing circuit according to claim 1, wherein the processing circuit is arranged so as to be sandwiched between the first reference voltage supplying circuit and the second reference voltage supplying circuit in a plan view of the signal processing circuit.

3. The signal processing circuit according to claim 1, wherein the first reference voltage supplying circuit and the second reference voltage supplying circuit supply the reference signal line with a same potential.

4. The signal processing circuit according to claim 1, wherein
    the first reference voltage supplying circuit and the second reference voltage supplying circuit each have a current control counter, an offset control circuit, a current source, and a load resistor,
    a current of the current source is controlled by the current control counter and the offset control circuit, and the reference signal line is supplied with a potential based on the current and the load resistor.

5. The signal processing circuit according to claim 1, wherein
    the first reference voltage supplying circuit and the second reference voltage supplying circuit each have a current source, an integral capacitor, and a reset circuit, and
    a reference signal is generated by the current source and the integral capacitor after a potential of the reference signal line is reset by the reset circuit.

6. The signal processing circuit according to claim 1, wherein the connecting circuit places the connection between the second reference voltage supplying circuit and the other end of the reference signal line in a non-connected state during a period in which the processing circuit is executing the processing but places the connection between the second reference voltage supplying circuit and the other end of the reference signal line in a connected state during a period in which the processing circuit is not executing the processing.

7. The signal processing circuit according to claim 6, wherein the first reference voltage supplying circuit outputs a reference signal to the one end of the reference signal line during the period in which the processing circuit is executing the processing.

8. The signal processing circuit according to claim 1, further comprising a power control circuit for controlling such that power, which is to be supplied to the second reference voltage supplying circuit during a period in which the second reference voltage supplying circuit and the other end of the reference signal line are placed in a non-connected state by the connecting circuit, is lower than power supplied to the second reference voltage supplying circuit during a period in which the second reference voltage supplying circuit and the other end of the reference signal line are placed in a connected state by the connecting circuit.

9. The signal processing circuit according to claim 1, wherein the processing performed by the processing circuit is processing for converting the input signal into a digital signal.

10. A photoelectric conversion apparatus comprising:
   a photoelectric conversion circuit that outputs a signal in accordance with incident light; and
   the signal processing circuit according to claim 1 which processes the signal output by the photoelectric conversion circuit.

11. An equipment, comprising:
   the photoelectric conversion apparatus according to claim 10; and
   at least any one selected from among six below,
   an optical system for forming an image on the photoelectric conversion apparatus,
   a control apparatus that controls the photoelectric conversion apparatus,
   a processing apparatus that processes a signal output from the photoelectric conversion apparatus,
   a display apparatus that displays information obtained by the photoelectric conversion apparatus,
   a storage apparatus that stores information obtained by the photoelectric conversion apparatus, and
   a machine apparatus that has a movable portion or a propelling portion.

* * * * *